(12) United States Patent
Nishiwaki

(10) Patent No.: US 6,900,831 B2
(45) Date of Patent: May 31, 2005

(54) IMAGE-SENSING APPARATUS FOR SELECTING OPTICAL BLUR CORRECTION OR ELECTRONIC BLUR CORRECTION

(75) Inventor: Kenya Nishiwaki, Kanagawa (JP)

(73) Assignee: Canon Kabushiki Kaisha (JP)

( * ) Notice: Subject to any disclaimer, the term of this patent is extended or adjusted under 35 U.S.C. 154(b) by 959 days.

(21) Appl. No.: 09/766,108

(22) Filed: Jan. 19, 2001

(65) Prior Publication Data

US 2001/0022619 A1 Sep. 20, 2001

(30) Foreign Application Priority Data

Jan. 20, 2000 (JP) ........................................ 2000-011878

(51) Int. Cl.[7] ........................ H04N 5/228; G03B 17/00
(52) U.S. Cl. .................................... 348/208.5; 396/55
(58) Field of Search ....................... 348/208.99, 208.1, 348/208.2, 208.3, 208.4, 208.5, 208.6, 208.7, 208.8, 208.11, 208.12, 208.13, 208.14, 208.15, 208.16, 699, 700, 701, 702; 376/52, 53, 54, 55

(56) References Cited

U.S. PATENT DOCUMENTS

| | | | |
|---|---|---|---|
| 5,175,580 A | 12/1992 | Shiomi | ........................ 354/410 |
| 5,337,098 A | 8/1994 | Imafuji et al. | ................. 354/70 |
| 5,420,661 A | 5/1995 | Hamada et al. | ............. 354/402 |
| 5,815,742 A | 9/1998 | Hamada et al. | ................ 396/55 |
| 5,867,213 A * | 2/1999 | Ouchi | ...................... 348/208.5 |
| 5,940,631 A | 8/1999 | Hirano et al. | .................. 396/55 |
| 5,982,421 A * | 11/1999 | Inou et al. | ................ 348/208.5 |
| 6,046,768 A | 4/2000 | Kaneda et al. | .............. 348/208 |
| 6,573,930 B2 * | 6/2003 | Kyuma et al. | ............ 348/208.5 |

FOREIGN PATENT DOCUMENTS

| | | |
|---|---|---|
| EP | 0 481 230 | 4/1992 |
| JP | 09-033970 | 2/1997 |

OTHER PUBLICATIONS

European Search Report, Oct. 22, 2001.

* cited by examiner

*Primary Examiner*—Aung Moe
*Assistant Examiner*—Justin Misleh
(74) *Attorney, Agent, or Firm*—Morgan & Finnegan, LLP

(57) ABSTRACT

When an object image is to be recorded, a blur of the object image is optically corrected. When an object image is to be displayed without being recorded, a blur of the object image is corrected not optically but by image signal processing.

38 Claims, 8 Drawing Sheets

IMAGE-SENSING APPARATUS FOR SELECTING OPTICAL BLUR CORRECTION OR ELECTRONIC BLUR CORRECTION

FIELD OF THE INVENTION

The present invention relates to an image-sensing apparatus and, more particularly, an image-sensing apparatus capable of correcting a blur of a sensed image caused by a camera shake by a user.

BACKGROUND OF THE INVENTION

Conventionally, many video cameras and silver halide cameras have been marketed, which have built-in blur correcting functions for preventing an adverse effect on a sensed image caused by a blur such as a camera shake by a user during image sensing.

These blur correcting functions are roughly classified into a so-called electronic correction system and a so-called optical correction system. In the electronic correction system, that portion of an image sensed by an image-sensing device such as a CCD, which is to be displayed on a display, is changed in accordance with a camera shake, thereby displaying an image with no blur on the display. In the optical correction system, a sensor such as a vibration gyro senses a blur and, on the basis of the result of sensing, the apical angle of a variable apical angle prism is changed or a part of an image-sensing lens is shifted, thereby preventing a blur of a sensed image on an image-sensing surface.

These two systems will be briefly described below. In the electronic correction system, an output image signal from an image-sensing optical system is processed and temporarily stored in a field memory. An image signal of a present field output from the image-sensing optical system after that is compared with the image signal of the preceding field stored in the field memory. A blur amount of the present field is calculated from the preceding field, and the blur is corrected by shifting the image read position, as needed, so as to cancel the blur amount. This electronic correction system is primarily used to correct blurs of motion images obtained by video cameras and the like.

In the optical correction system, an image-sensing apparatus main body is equipped with an angular velocity sensor for sensing a blur. On the basis of an angular velocity signal obtained from this angular velocity sensor, the optical axis is shifted by an optical axis correction unit such as a variable prism placed in the optical path of an image-sensing optical system, thereby correcting the blur of an image on an image formation surface. This system does not deteriorate a sensed image by the correcting operation. Also, the angle of the optical axis is corrected in accordance with the angle of a shake of a camera main body. Hence, the influence of a camera shake can be well eliminated even when an image-sensing lens has a long focal length. This makes the system superior in image quality to the former system. This optical correction system is mainly used to correct blurs of still images obtained by silver halide cameras and the like.

Recently, so-called digital cameras which sense still images by an image-sensing device such as a CCD are finding widespread use in place of silver halide films. This digital camera is a new market field rapidly growing with the increasing needs for digital images by the spread of personal computers and with the improving image quality by the progress of technologies of various devices such as a CCD.

FIG. 8 is block diagram showing an outline of the arrangement of a conventional digital camera 101. An object image formed on an image-sensing device 103 by an image-sensing optical system 102 is converted into an image signal by the image-sensing device 103. This image signal is subjected to various processes by an A/D converter 104 and a signal processor 105 and saved in a recorder 106 such as a memory card. An image display 107 such as a monitor can display the image saved in the recorder 106 or an image currently being sensed by the image-sensing device 103. Of these components, the image-sensing optical system 102 has functions analogous to those of conventional silver halide cameras. The signal processor 105 and the display 107 have arrangements similar to video cameras.

Blur correction methods of the above image-sensing apparatus are classified into the electronic correction scheme and the optical correction scheme as described above, and these two schemes respectively have their drawbacks.

The electronic correction scheme is based on the condition that an image-sensing signal is obtained by an image-sensing device such as a CCD. Also, when blur correction is to be performed, enlarged reading (electronic zooming) is performed by omitting a peripheral portion of an entire image. Therefore, the corrected image is shifted to a telephoto side from the image-sensing field angle of the optical system, and the image quality deteriorates.

On the other hand, the optical correction scheme takes much time to activate the blur sensor such as a gyro sensor and also requires high power to drive these components.

Also, a digital camera as a kind of an image-sensing apparatus is required to display motion images on the monitor at any time, like a video camera, while an object image is observed, and to record still images with high image quality, like a silver halide camera, during image sensing.

SUMMARY OF THE INVENTION

The present invention has been made in consideration of the above situation, and has as its object to provide an image-sensing apparatus capable of effectively correcting a blur of an image with low power consumption, and a control method of the apparatus.

To achieve the above object, an image-sensing apparatus according to the first aspect of the present invention is characterized by comprising a recorder for recording an object image, a display for displaying an object image, a first blur correction unit for optically correcting a blur of an object image to be recorded by the recorder, a second blur correction unit for correcting a blur of an object image to be displayed by the display by image signal processing, and a controller arranged to operate the second correction unit without operating the first correction unit when the display displays an object image while the recorder does not record an object image, and to operate the first correction unit when the recorder records an object image.

An image-sensing apparatus according to the second aspect of the present invention is characterized by comprising a recorder for recording an object image, a display for displaying an object image, a first blur correction unit for optically correcting a blur of the object image to be recorded by the recorder, a second blur correction unit for correcting a blur of the object image to be displayed by the display by image signal processing, and a controller for operating the second correction unit without operating the first correction unit in a display mode in which the display displays the object image while the recorder does not record the object image, and operating the first correction unit in response to switching to a recording mode in which the recorder records the object image.

An image-sensing apparatus according to the third aspect of the present invention is an image-sensing apparatus capable of optically correcting a blur of an object image to be recorded by using a first correction unit, characterized by comprising a recorder for recording an object image, a display for displaying an object image, a second blur correction unit for correcting a blur of an object image to be displayed by the display by image signal processing, and a controller for operating the second correction unit without operating the first correction unit when the display displays the object image while the recorder does not record the object image, and operating the first correction unit when the recorder records the object image.

The fourth aspect of the present invention relates to a method of controlling an image-sensing apparatus comprising a recorder for recording an object image and a display for displaying an object image, comprising the steps of operating a second correction unit for correcting a blur of an object image to be displayed by the display by image signal processing without operating a first correction unit for optically correcting a blur of an object image to be recorded by the recorder, when the display displays an object image while the recorder does not record the object image, and operating the first correction unit when the recorder records the object image.

The fifth aspect of the present invention is a method of controlling an image-sensing apparatus comprising a recorder for recording an object image and a display for displaying an object image, comprising the steps of operating a second correction unit for correcting a blur of an object image to be displayed by the display by image signal processing without operating a first correction unit for optically correcting a blur of an object image to be recorded by the recorder, in a display mode in which the display displays an object image while the recorder does not record the object image, and operating the first correction unit in response to switching to a recording mode in which the recorder records the object image.

The sixth aspect of the present invention relates to a computer program product providing a control program of an image-sensing apparatus comprising a recorder for recording an object image and a display for displaying an object image, the control program comprising the steps of operating a second correction unit for correcting a blur of an object image to be displayed by the display by image signal processing without operating a first correction unit for optically correcting a blur of an object image to be recorded by the recorder, when the display displays an object image while the recorder does not record the object image, and operating the first correction unit when the recorder records the object image.

The seventh aspect of the present invention is a computer program product providing a control program of an image-sensing apparatus comprising a recorder for recording an object image and a display for displaying an object image, the control program comprising the steps of operating a second correction unit for correcting a blur of an object image to be displayed by the display by image signal processing without operating a first correction unit for optically correcting a blur of an object image to be recorded by the recorder, in a display mode in which the display displays an object image while the recorder does not record the object image, and operating the first correction unit in response to switching to a recording mode in which the recorder records the object image.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Figure 1:
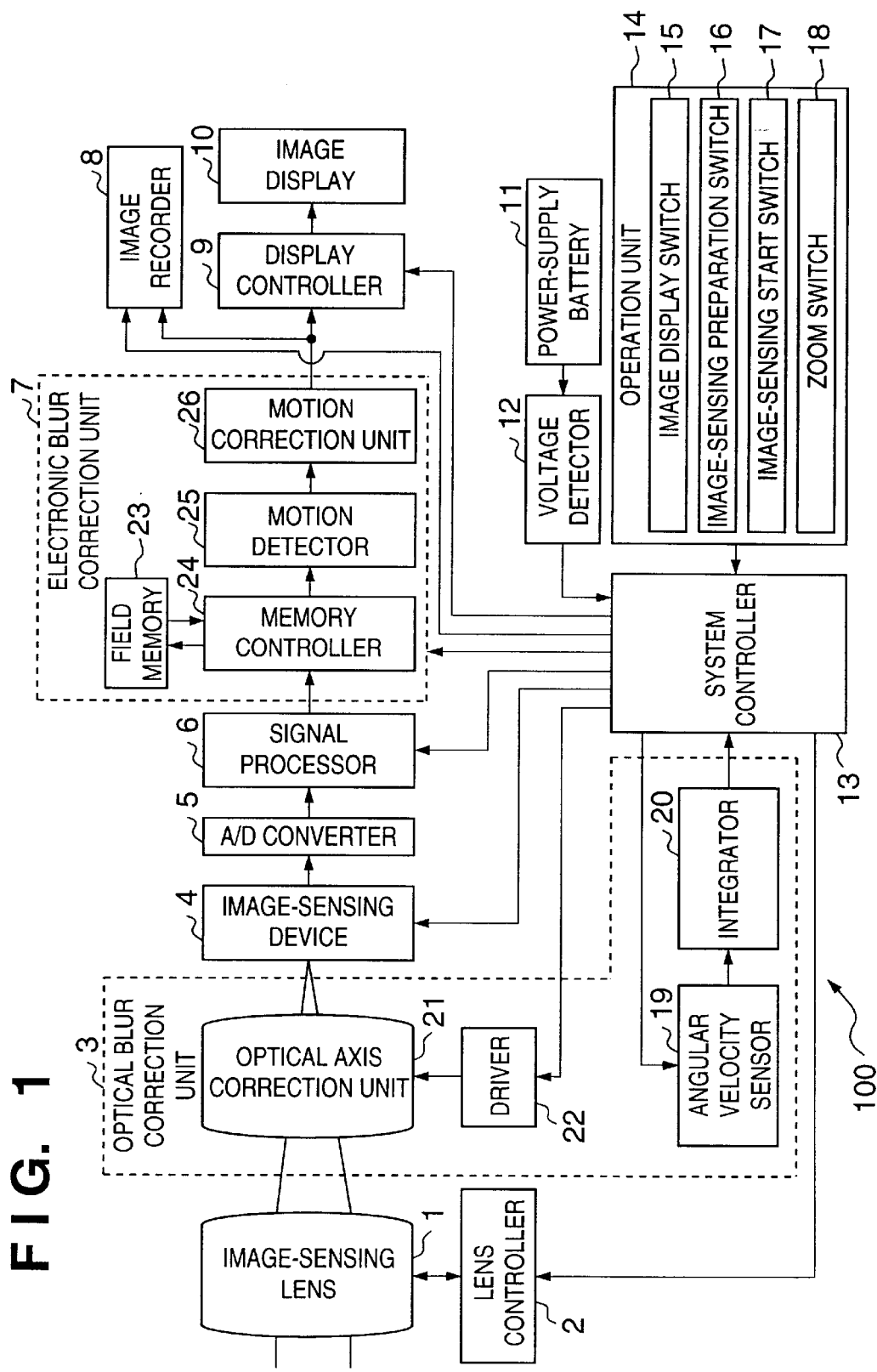
FIG. 1 is a block diagram showing the arrangement of a digital camera 100 having a blur correcting function according to the first embodiment of the present invention.

Embodiments of the present invention will be described in detail below with reference to the accompanying drawings.
(1) First Embodiment FIG. 1 is a block diagram showing the arrangement of a digital camera having a blur correcting function according to the first embodiment of the present invention. Reference numeral 1 denotes an image-sensing lens which optically forms an object image and has a zoom function. This image-sensing lens 1 includes a focusing lens and zooming lens. A lens controller 2 includes motors and gears for moving the focusing lens and zooming lens of the image-sensing lens 1 for focus adjustment and zooming, respectively, and an encoder for detecting the position of the focusing lens and/or the position of the zooming lens. An optical blur correction unit 3 corrects a blur of an object image by shifting the optical axis of the image-sensing lens 1. Details of this optical blur correction unit 3 will be described later.

Reference numeral 4 denotes an image-sensing device such as a CCD for receiving an object image formed on a light-receiving surface by the image-sensing lens 1 and converting the image into an analog image signal. An A/D converter 5 converts the output analog image signal from the image-sensing device 4 into a digital image signal. A signal processor 6 performs various processes for the signal converted by the A/D converter 5. Reference numeral 7 denotes an electronic blur correction unit, the details of which will be described in detail later. Reference numeral 8 denotes an image recorder for recording an image signal; 9, an image display controller for converting an image signal into data to be displayed and switching displays; and 10, an image display for displaying an image.

Reference numeral 11 denotes a power-supply battery for supplying power to the individual units; 12, a voltage detector for detecting the voltage of the power-supply battery 11; and 13, a system controller comprising, e.g., a microcomputer for controlling the entire camera and a memory storing a control program to be supplied to the microcomputer. This control program is sold or distributed as it is stored in a memory medium such as a CD-ROM and can be installed into the camera 100 by connecting to the camera 100 a personal computer or the like having a function of reading out the program. Reference numeral 14 denotes an operation unit by which a user gives various instructions to the controller 13. This operation unit 14 includes an image display switch 15 for instructing the image display controller 9 to display an image, an image-sensing preparation switch 16 for instructing each unit of the camera to prepare for image sensing, an image-sensing start switch 17 for instructing each unit to start image sensing, a zoom switch 18 for changing the image-sensing field angle of the image-sensing lens 1, and other various switches (not shown). The image-sensing preparation switch 16 and the image-sensing start switch 17 are typically integrated push button switches which are turned on in turn by a series of pressing operations of a shutter release member.

The arrangement of the optical blur correction unit 3 will be described below. Referring to FIG. 1, an angular velocity sensor 19 senses the vertical shake angular velocity and lateral shake angular velocity of the camera. An integrator 20 integrates an output signal from the angular velocity sensor 19, performs A/D conversion for the signal, and outputs a vibration angular displacement signal. Reference numeral 21 denotes an optical axis correction unit such as a variable apical angle prism placed in the optical path of the image-sensing lens 1; and 22, a driver. This driver 22 drives the optical axis correction unit 21 in accordance with the output from the integrator 20, thereby shifting the optical axis of the image-sensing lens 1 in the vertical and lateral directions and correcting a blur of an object image on the image-sensing device 4.

The arrangement of the electronic blur correction unit 7 will be described below. Referring to FIG. 1, a field memory 23 temporarily saves a digital signal from the signal processor 6. A memory controller 24 controls input and output of signals to and from the field memory 23. A motion detector 25 compares a signal of a present field output from the signal processor 6 with a signal of a preceding field saved in the field memory 23 and obtains the moving amount of the present field from the preceding field. On the basis of the information from this motion detector 25, a motion correction unit 26 shifts the image read position, as needed, so as to cancel the moving amount, thereby enlarging the whole image. When not performing blur correction, the electronic blur correction unit 7 directly outputs an input image signal.

Figure 2:
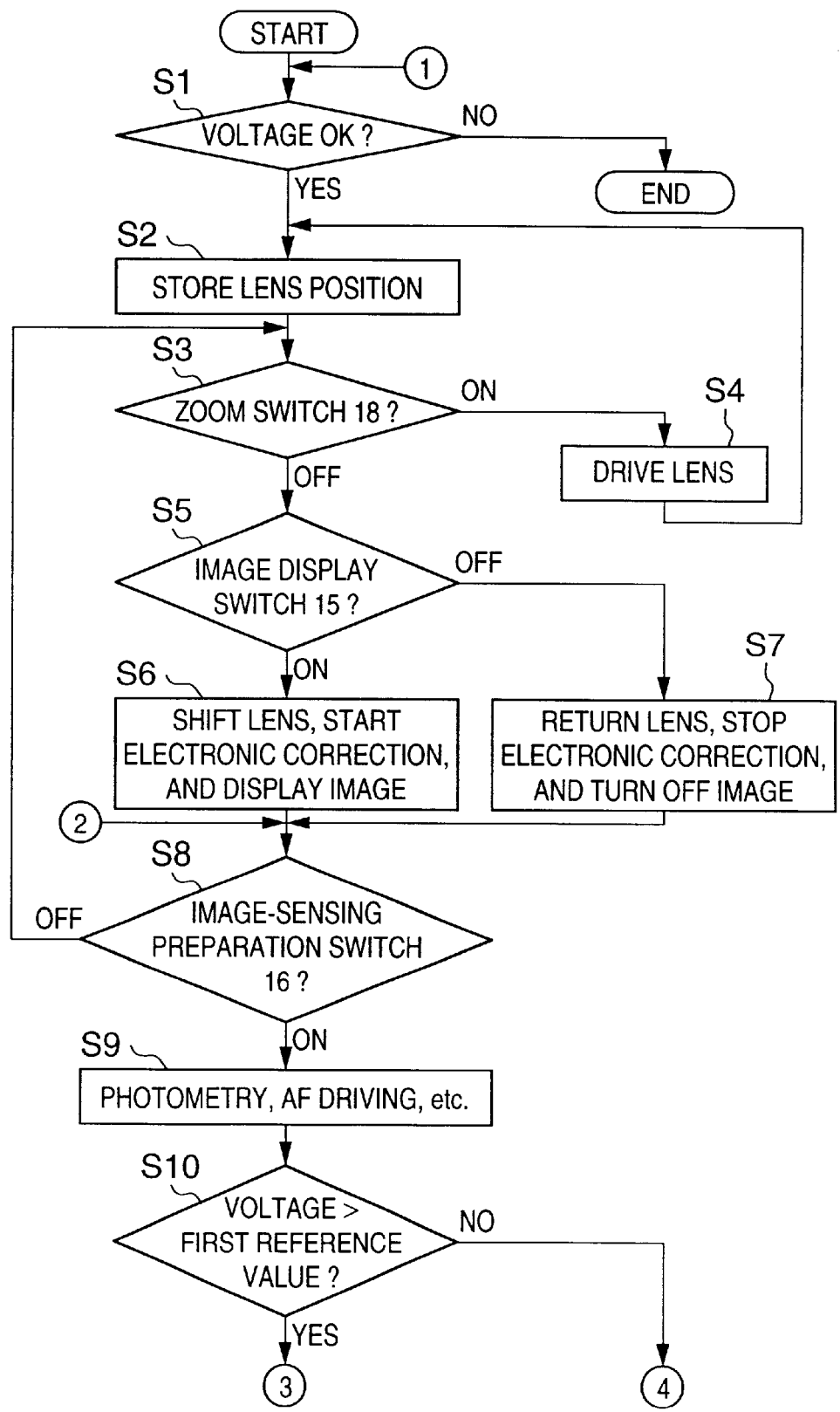
FIGS. 2 and 3 are flow charts showing the operation of the digital camera 100.
Figure 3:
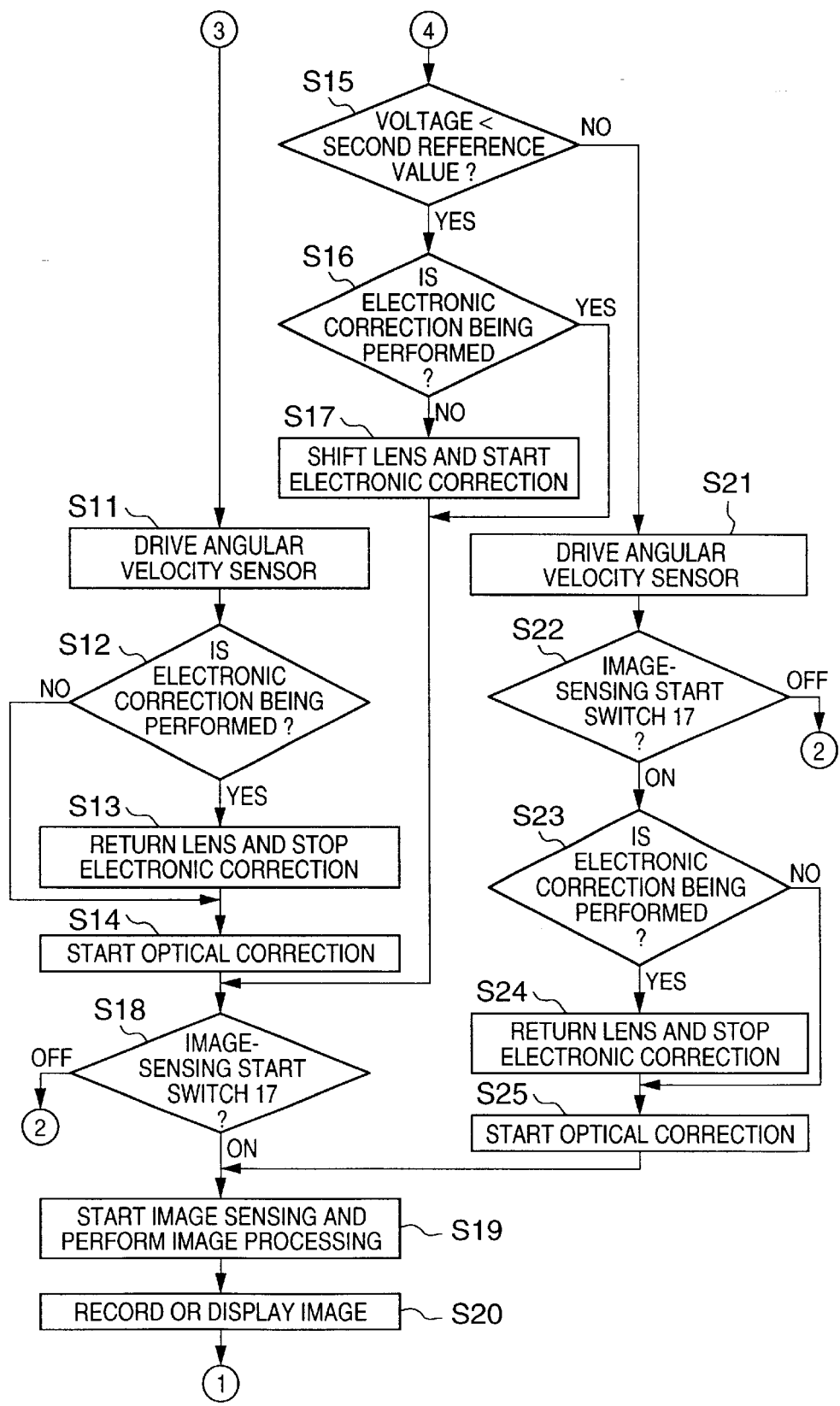

The operation of the digital camera 100 constructed as above will be described below with reference to flow charts in FIGS. 2 and 3. First, when a user turns on the power supply of the digital camera 100 by operating a power switch (not shown) of the operation unit 14, the system controller 13 checks the voltage of the power-supply battery 11 via the voltage detector 12, thereby checking whether the voltage is appropriate for the operation of the digital camera 100 (step S1). If the voltage is appropriate, the system controller 13 detects and stores the position of the zooming lens of the image-sensing lens 1 by the lens controller 2 (step S2), and checks whether the zoom switch 18 is being operated (step S3). While the zoom switch 18 is being operated, the system controller 13 causes the lens controller 2 to drive the zooming lens of the image-sensing lens 1 (step S4), and again stores the position of the zooming lens.

If the zoom switch 18 is not being operated, the system controller 13 checks whether the image display switch 15 is ON (step S5). If the image display switch 15 is ON, the system controller 13 first causes the lens controller 2 to shift the position of the zooming lens of the image-sensing lens 1 to a wide side from the previously stored position, captures an image signal from the image-sensing device 4 in this state, performs blur correction for the loaded image signal by the electronic blur correction unit 7, and displays the image on the image display 10 (step S6). This blur-corrected image is an image enlarged or trimmed to a field angle corresponding to the original zooming lens position. If the image display switch 15 is OFF in step S5, the system controller 13 returns the zooming lens of the image-sensing lens 1 to the original position, stops the blur correction by the electronic blur correction unit 7, and terminates the display of the image by the image display 10 (step S7).

Subsequently, the system controller 13 checks whether the image-sensing preparation switch 16 is ON (step S8). If the image-sensing preparation switch 16 is not ON, the flow returns to step S3, and the system controller 13 waits while repeating the operation so far. If the image-sensing preparation switch 16 is ON, the system controller 13 performs image-sensing preparation control such as photometry and AF (Automatic Focusing) driving (step S9). After that, the system controller 13 checks whether the voltage of the power-supply battery 11 exceeds a first reference value sufficient to perform optical blur correction (step S10). If the voltage exceeds the first reference value, the system controller 13 first drives the angular velocity sensor 19 (step S11) and then checks whether electronic blur correction is being performed (step S12). If electronic blur correction is being performed, the system controller 13 stops the correction and simultaneously restores the above-mentioned shift amount of the zooming lens of the image-sensing lens 1 (step S13). If no electronic blur correction is being performed, the system controller 13 skips the processing in step S13.

The system controller 13 operates the angular velocity sensor 19 and the integrator 20 to detect vertical and lateral vibrations applied to the camera 100 main body, drives the optical axis correction unit 21 via the driver 22 to shift the optical axis of the image-sensing lens 1 in the vertical and lateral directions, and starts correcting a blur of the object image on the image-sensing device 4 (step S14).

The system controller 13 then waits for a predetermined time until the image-sensing start switch 17 is operated (step S18). This image-sensing start switch 17 is turned on when the image-sensing preparation switch 16 is turned on by pressing the shutter release member and the shutter release member is subsequently further pressed. Since the operation is simple, the procedure can smoothly proceed on to the start of image sensing after the image-sensing preparations are completed. If the image-sensing start switch 17 is not turned on within the predetermined time, the flow returns to step S8. If the image-sensing start switch 17 is turned on within the predetermined time, the system controller 13 controls the image-sensing device 4 and drives a shutter (not shown) and the like to perform image sensing (step S19). If the voltage level of the power-supply battery 11 is equal to or more than the first reference value (a first level) large enough to perform optical blur correction (YES in step S10), blur correction with high image quality is performed by optical blur correction during image sensing.

When image sensing is completed, the system controller 13 records the image signal in the image recorder 8 and displays the image of the image signal on the image display 10 via the display controller 9 (step S20), and the flow returns to step S1. Accordingly, the user can confirm the effect of the blur correcting operation immediately after image sensing.

If in step S10 the voltage of the power-supply battery 11 is less than the first reference value, the system controller 13 checks whether the voltage level of this power-supply battery 11 is less than a second reference value (a second level) which is a minimum necessary amount for performing optical blur correction (step S15). If the voltage level of the power-supply battery 11 is less than this second reference value, no optical blur correction is possible. Therefore, the system controller 13 determines that a series of blur correcting operations before image sensing are to be performed by electronic blur correction, and first checks whether electronic blur correction is being performed (step S16). If no electronic blur correction is being performed, the system controller 13 shifts the position of the zooming lens of the image-sensing lens 1 to a wide side from the position stored in step S2 and starts electronic blur correction (step S17), as in step S6 described previously. After that, the system controller 13 executes steps S18 to S20.

Processing when the voltage level of the power-supply battery 11 is equal to or higher than the second reference level will be described below. In this state, the power-supply battery 11 has exhausted to some extent, but optical blur correction is still possible.

When this is the case, the system controller 13 first operates the angular velocity sensor 19 and the integrator 20, requiring a considerable time for detection preparations, among other optical blur correcting operations, and starts detecting only vertical and lateral vibrations applied to the camera 100 main body (step S21). If electronic blur correction is being performed at that time, the system controller 13 continues the correction. After that, the system controller 13 waits for a predetermined time until the image-sensing start switch 17 is turned on (step S22). If the image-sensing start switch 17 is not turned on within the predetermined time, the flow returns to step S8. If the image-sensing start switch 17 is turned on within the predetermined time, the system controller 13 checks whether electronic blur correction is being performed (step S23). If electronic blur correction is being performed, the system controller 13 stops the correction and at the same time restores the shift amount of the zooming lens of the image-sensing lens 1 (step S24). If no electronic blur correction is being performed, the system controller 13 skips the processing in step S24. The system controller 13 drives the optical axis correction unit 21 via the driver 22 to shift the optical axis of the image-sensing lens 1 in the vertical and lateral directions, and starts correcting the blur of the object image on the image-sensing device 4 (step S25), and the flow advances to step S19. In this manner, minimum necessary blur detecting operation is performed in the image-sensing preparation stages. This saves more energy and allows rapid optical blur correction when image sensing is started.

Figure 4:
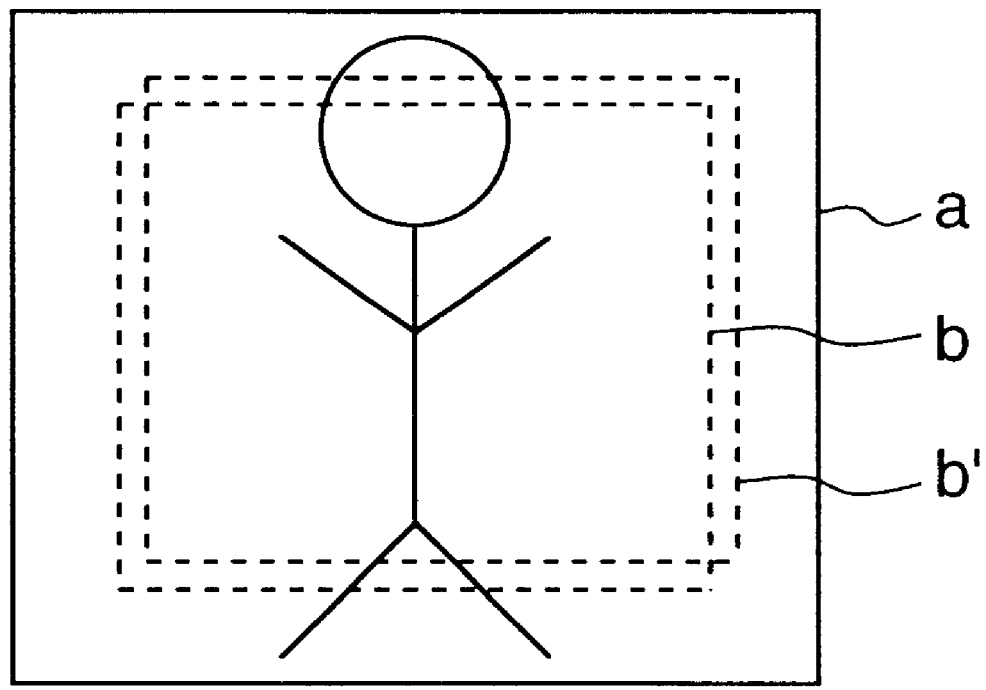
FIGS. 4, 5A to 5C, 6A, and 6B are views for explaining the contents of electronic blur correction.
Figure 5A:
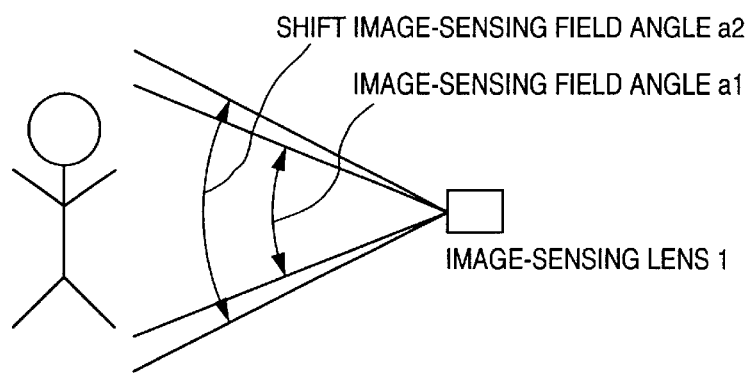
Figure 5B:
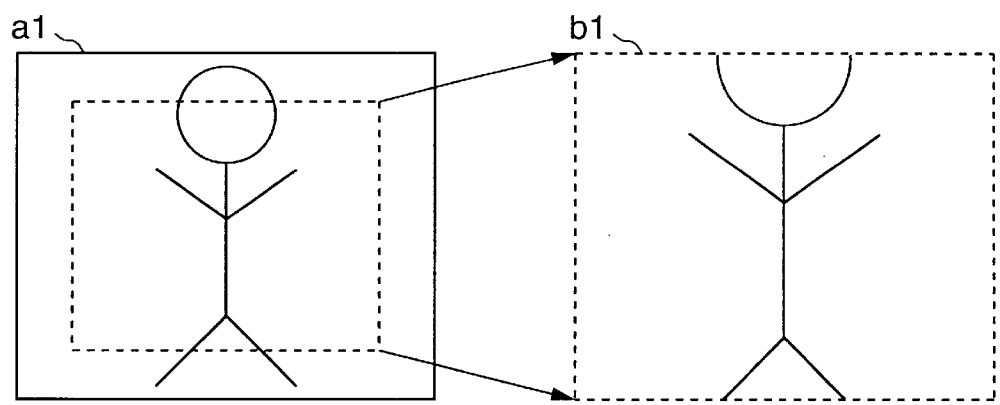
Figure 5C:
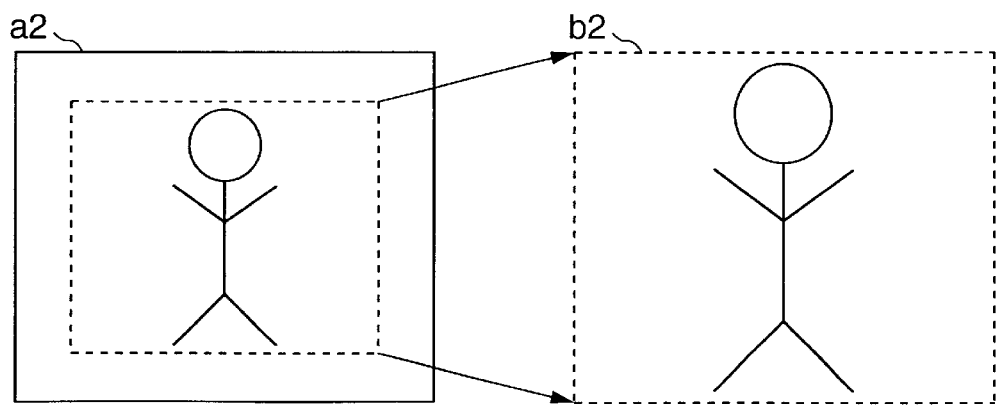

Electronic blur correction by the camera 100 will be described in detail below with reference to FIG. 4. An image signal output from the image-sensing device 4 via the A/D converter 5 and the signal processor 6 is temporarily saved in the field memory 23. In FIG. 4, reference symbol a indicates an image temporarily saved in the field memory 23, and this region is equal to the region of an image sensed by the image-sensing device 4. Reference symbol b indicates an image read out from the field memory 23. This region is equal to a region obtained by omitting a peripheral portion and extracting only a central portion from the image sensed by the image-sensing device 4. In other words, the region of the image b is equal to an image region obtained by shifting the image-sensing lens 1 to a telephoto side from a field angle corresponding to the image a. Electronic blur correction of this embodiment is implemented by repetitively performing the operation of thus temporarily saving the whole of an image region and extracting a part thereof, calculating the moving amounts in the vertical and lateral directions of the sensed image from the correlation between the saved image information and image information of the next frame, and extracting an image region to be extracted by moving the image region as indicated by reference symbol b'. As shown in FIG. 5B, however, the obtained image is an image (b2) closer to a telephoto side than an initial image (a1) of the image-sensing lens 1. In electronic blur correction of this embodiment, therefore, as shown in FIG. 5A, the field angle of the image-sensing lens 1 is shifted to a wide side by the corresponding amount to capture an image (a2) having a wider image-sensing region. This, as shown in FIG. 5C, makes the image (b2) after electronic blur correction equal to the initial image (a1 in FIG. 5B) when no electronic blur correction is performed. As described above, when electronic blur correction is performed, an image equivalent to a desired field angle can be obtained by shifting the image-sensing lens.

In this embodiment as described above, when the image recorder 8 does not record an output image signal from the signal processor 6, the image display 10 displays an image signal corrected by the electronic blur correction unit 7 (step S6). That is, when an object is merely observed without image sensing, power consumption can be reduced by performing electronic blur correction. On the other hand, when the image recorder 8 is to record an output image signal from the signal processor 6, this image recorder 8 records an image signal obtained by correcting the optical axis of the image-sensing lens 1 by the optical axis correction unit 21 (steps S14 and S25). That is, when image sensing is performed, a high-quality image can be obtained by performing optical blur correction.

In the first operation of this embodiment, the correcting operation by electronic blur correction is started (step S6) in accordance with the operation (ON in step S5) of the image display switch 15. This correcting operation by electronic blur correction is stopped (step S13) in accordance with the operation (ON in step S8) of the image-sensing preparation switch 16, and the correcting operation by optical blur correction is started (step S14). The image recorder 8 records an image signal in accordance with the operation (ON in step S18) of the image-sensing start switch 17. Therefore, when an object is merely observed without image sensing, the effect of optical blur correction by which a high-quality image is obtainable can be observed in a pseudo manner by electronic blur correction with low power consumption. When image sensing is to be performed, an image subjected to this optical blur correction by which a high-quality image is obtainable can be sensed with a small time lag.

In the second operation of this embodiment, the correcting operation by electronic blur correction is started (step S6) in accordance with the operation (ON in step S5) of the image display switch 15. In accordance with the operation (ON in step S8) of the image-sensing preparation switch 16, only defection of vertical and lateral vibrations applied to the camera 100 main body is started (step S21) without starting optical blur correction. In accordance with the operation (ON in step S22) of the image-sensing start switch 17, the correcting operation by electronic blur correction is stopped (step S24), the optical axis correcting operation corresponding to the above vibration detection result is started for the image-sensing lens 1 by the optical axis correction unit 21 (step S25), and the image recorder 8 records the image signal (steps S19 and S20). That is, in the image-sensing preparation stages, only the vibration detecting operation which requires a considerable time for detection preparations is performed. This can further save energy and, when image sensing is started, a high-quality image subjected to optical blur correction can be sensed with a small time lag.

Also, in this embodiment, the correcting operation by electronic blur correction is started (step S6) by the operation of the image display switch 15. After that, the first or second operation described above is selected in accordance with the output voltage from the power-supply battery 11. More specifically, if the voltage level of the power-supply battery 11, detected by the voltage detector 12, is equal to or more than the first reference value large enough to perform optical blur correction (YES in step S10), the first operation is executed. That is, the correcting operation by electronic blur correction is stopped (step S13) in accordance with the operation (ON in step S8) of the image-sensing preparation switch 16, and the correcting operation by optical blur correction is started (step S14). The image recorder 8 records the image signal (steps S19 and S20) in accordance with the operation (ON in step S18) of the image-sensing start switch 17. On the other hand, if the voltage level of the power-supply battery 11, detected by the voltage detector 12, is equal to or more than the second reference value which is a minimum necessary amount for performing optical blur correction, and is less than the first reference value large enough to perform optical blur correction (NO in step S15), the second operation is executed. That is, in accordance with the operation (ON in step S8) of the image-sensing preparation switch 16, only detection of vertical and lateral vibrations applied to the camera 100 main body is started (step S21) without starting optical blur correction. In accordance with the operation (ON in step S22) of the image-sensing start switch 17, the correcting operation by electronic blur correction is stopped (step S24), the optical axis correcting operation corresponding to the vibration detection result is started for the image-sensing lens 1 by the optical axis correction unit 21 (step S25), and the image recorder 8 records the image signal (steps S19 and S20). When the output voltage from the power-supply battery 11 is large enough, therefore, image sensing is started with a very small time lag in accordance with the operation of the image-sensing start switch 17. When this output voltage is not high enough, image sensing is started with a small time lag while power consumption is suppressed. That is, when the output voltage is not high enough, power consumption is suppressed by performing no optical blur correction immediately before image sensing, while only vibration detection taking time for detection preparations is performed. In accordance with the operation of the image-sensing start switch 17, image sensing is started after optical blur correction is started.

In this embodiment, if the voltage detected by the voltage detector 12 is less than the second reference value which is a minimum necessary amount for performing optical blur correction (YES in step S15), the third operation is executed: the image display unit 10 displays an image signal corrected by the electronic blur correction unit 7, and the image recorder 8 records this image signal. In this third operation, an object image subjected to electronic blur correction can be sensed while power consumption is minimized.

In this embodiment, while the electronic blur correction unit 7 is performing correction, the lens controller 2 shifts the image-sensing lens 1 towards a wide side from a desired field angle (a field angle determined by the operation of the zoom switch 18) (step S6). To cancel the correcting operation by the electronic blur correction unit 7, the lens controller 2 returns the image-sensing lens 1 to the original position (the desired field angle) (steps S7, S13, and S24). Accordingly, even when electronic blur correction is performed, an image having a desired field angle, from which no peripheral portion is omitted, can be displayed on the image display 10 (step S6) or sensed (steps S19 and S20). Also, an image having a desired field angle can be sensed even when image sensing is performed by switching from electronic blur correction to optical blur correction.

(2) Second Embodiment

The second embodiment differs from the first embodiment in that when electronic blur correction is performed in the image-sensing preparation stages, image synthesis is performed instead of shifting an image-sensing lens.

The arrangement of a camera according to the second embodiment is the same as the camera 100 described above, so a detailed description thereof will be omitted.

Figure 6A:
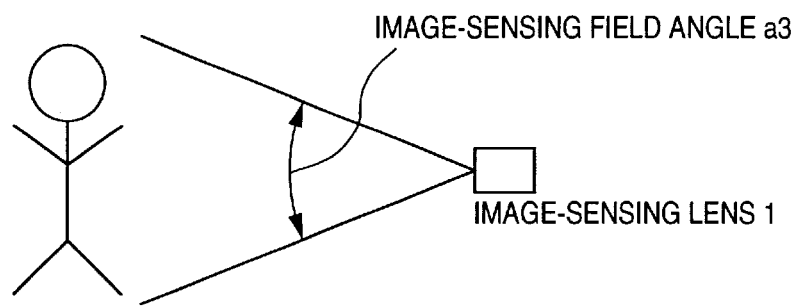
Figure 6B:
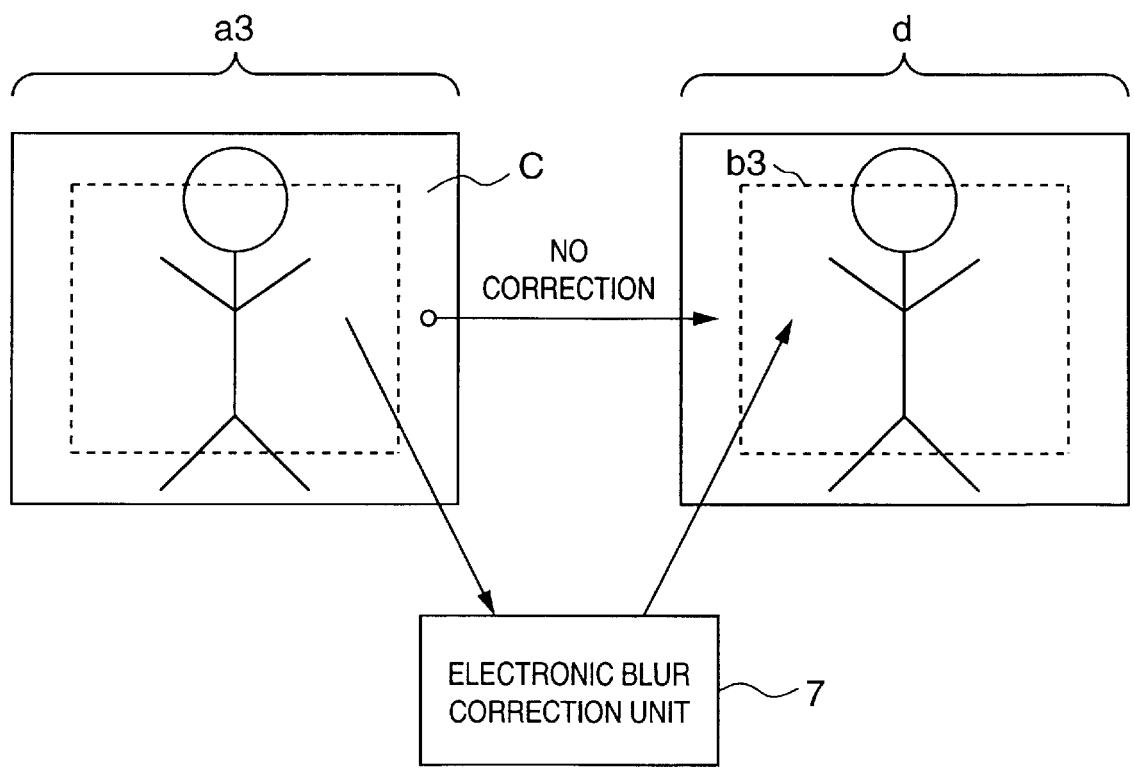

Electronic blur correction of this embodiment will be described in detail below with reference to FIGS. 6A and 6B. When an object is sensed by an image-sensing lens 1, the sensed image (a3) is temporarily saved in a field memory 23. After that, this image is read out, a motion detector 25 calculates a moving amount from the correlation between the readout image and an image of the next frame, and a motion correction unit 26 in an electronic blur correction unit 17 corrects an image blur. The obtained image (b3) is an image formed by omitting a peripheral portion (c) and extracting only a central portion from the initial image (a3). The processing up to this point is similar to electronic blur correction in the first embodiment. Subsequently, the motion correction unit 26 synthesizes the peripheral portion (c) discarded during the blur correction onto the image (b3) to reproduce the whole image, and an image display 10 displays this image. The displayed image (d) thus obtained contains the blur-corrected image (b3) as a central portion and the uncorrected image (c) as a peripheral portion (FIG. 6B). In this operation of a camera 100, the lens shifting operation by electronic blur correction in steps S6, S13, S17, and S24 of the flow charts shown in FIGS. 2 and 3 is replaced with the above image synthesizing operation.

With the above arrangement, an image equivalent to a desired field angle can be obtained only by electronic blur correction without shifting the zooming lens of the image-sensing lens 1 to a wide side. This can further reduce the time and power required for shift-driving the zooming lens and prevent lowering the image quality. Note that when an image having no blur up to its peripheral portion is desired as a sensed image by electronic blur correction, the operation need only be returned to electronic blur correction of the first embodiment when image sensing is started (step S19).

(3) Third Embodiment

The third embodiment differs from the second embodiment in the method of image synthesis.

The arrangement of a camera according to the third embodiment is the same as the camera 100 described earlier, so a detailed description thereof will be omitted.

Figure 7A:
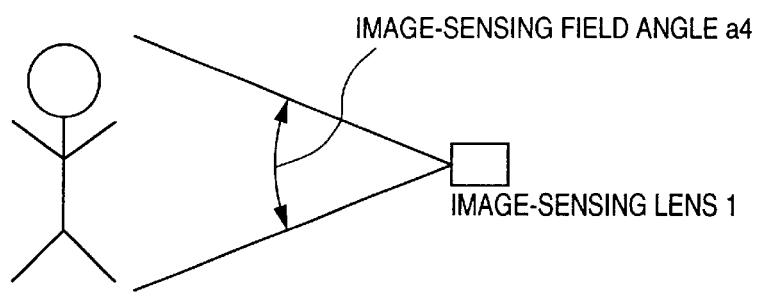
FIGS. 7A and 7B are views for explaining the contents of electronic blur correction.
Figure 7B:
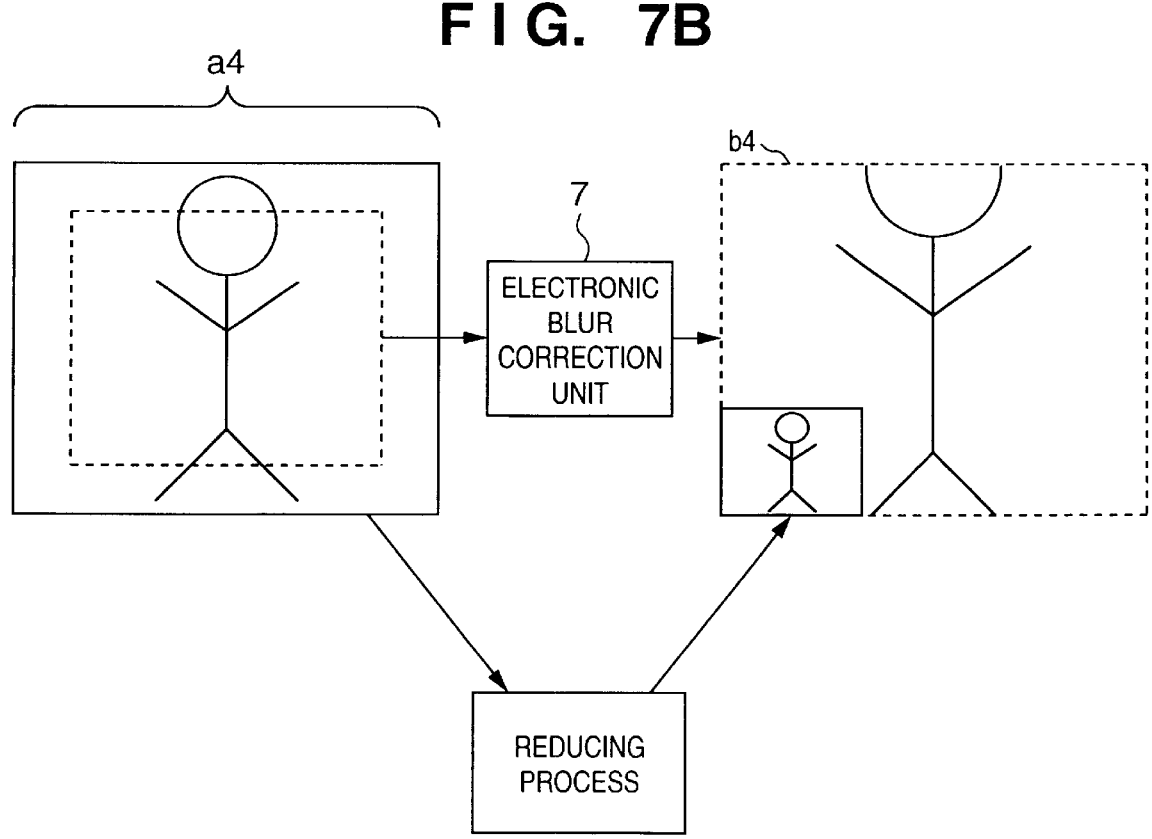
Figure 8:
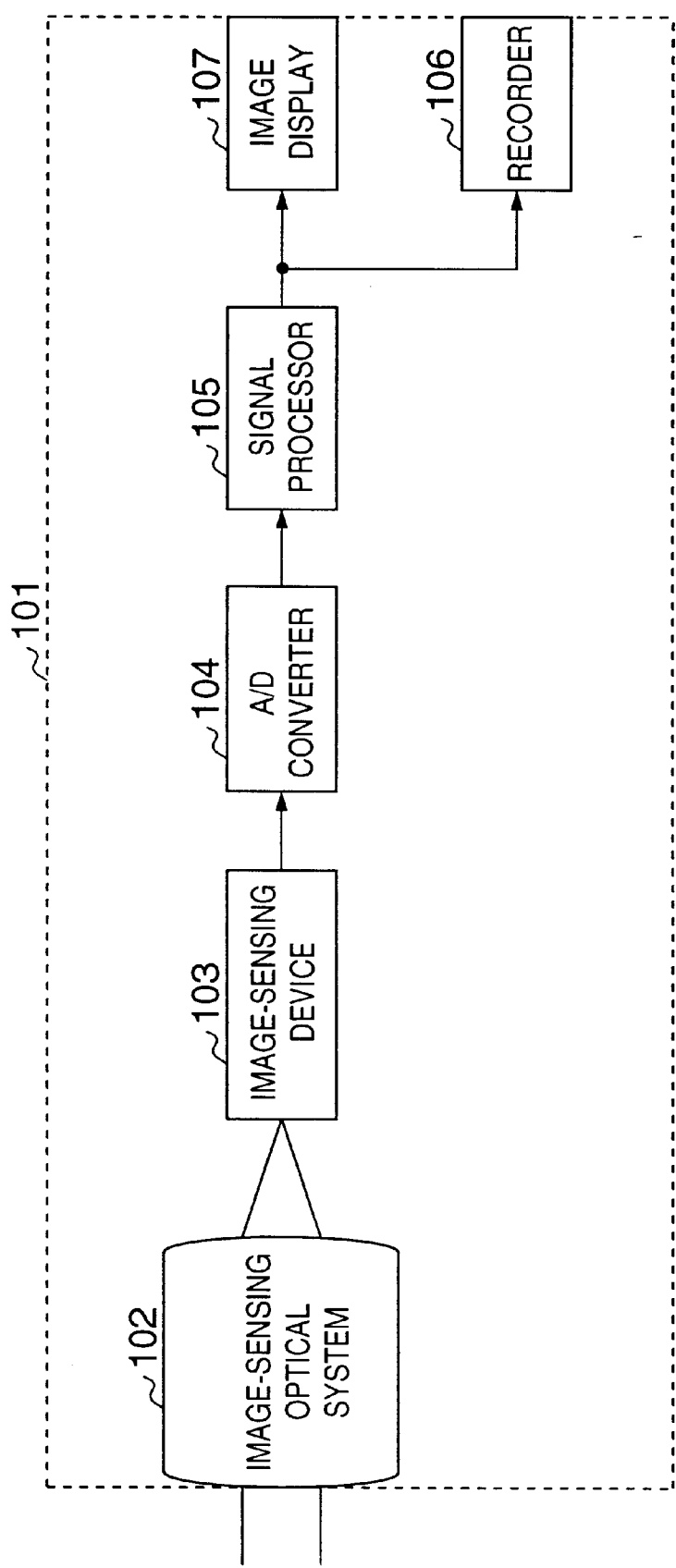
FIG. 8 is a view showing an outline of the arrangement of a conventional digital camera.

Electronic blur correction of this embodiment will be described in detail below with reference to FIGS. 7A and 7B. When an object is sensed by an image-sensing lens 1, the sensed image (a4) is temporarily saved in a field memory 23. After that, this image is read out, a motion detector 25 calculates a moving amount from the correlation between the readout image and an image of the next frame, and a motion correction unit 26 corrects an image blur. The obtained image (b4) is an image formed by omitting a peripheral portion and extracting only a central portion from the initial image (a4). In this embodiment, however, the motion correction unit 26 reduces the image (a4) before blur correction and synthesizes the reduced image on the corrected image (b4), and an image display 10 displays this synthetic image. In the displayed image thus obtained, the blur-corrected enlarged image is displayed in the entire image region, and the uncorrected whole image is displayed in a reduced scale in a part of the enlarged image. (FIG. 7B).

With this arrangement, while the whole image-sensing field angle is displayed as a reduced image, the blur-corrected central portion can be displayed in an enlarged scale. This is convenient for the user to observe details of the central portion where a main object (a blur-corrected object) is highly likely to exist. In addition, the convenience further increases if it is possible to change the presence/absence, position, and size of the reduced display by using a reduced display portion changing function. Note that when an image having a desired field angle by electronic blur correction is wanted, the operation need only be returned to electronic blur correction of the first embodiment when image sensing is started (step S19).

The present invention is not limited to the above embodiments but can take any form as long as the functions described in claims or the functions of the arrangements of the embodiments are achieved.

For example, in the above embodiments, whether the operation of the optical blur correction unit 3 is started when the image-sensing preparation switch 16 is operated or when the image-sensing start switch 17 is operated is determined in accordance with the voltage of the power-supply battery. However, this operation start timing can be set to one of these two timings regardless of the power-supply voltage or can be any arbitrary timing.

Also, in the above embodiments, the optical blur correction unit 3 and the electronic blur correction unit 7 are switched in accordance with the operating state of the image-sensing preparation switch 16. This switching can also be performed in accordance with a mode switch for switching a display mode and recording mode.

In the above embodiment, if the power-supply voltage is less than the second reference value, image sensing is performed by operating the electronic blur correction unit 7. However, the electronic blur correction unit 7 need not be operated in a case like this.

In the above embodiments, the condition of the power-supply battery is determined on the basis of its voltage level. However, the battery condition can also be determined on the basis of some other means such as an electric current.

It is also possible to receive a sensed image and a display image by different optical paths, correct a blur of the sensed image by the optical blur correction unit, and correct a blur of the display image by the electronic blur correction unit. When this is the case, the electronic blur correction unit can be kept operated even after the operation of the optical blur correction unit is started.

The optical blur correction unit and electronic blur correction unit are not restricted to those of the above embodiments. For example, the optical blur correction unit can correct a blur of an image in accordance with the motion vector of the image. Also, the electronic blur correction unit can correct a blur of an image in accordance with the detection result from an angular acceleration detector, angular velocity detector, or angular displacement detector.

The software configuration and hardware configuration of each of the above embodiments can be appropriately switched.

In the present invention, the whole or a part of the arrangement of each embodiment can form a single apparatus, can combine with another apparatus, or can be a component of an apparatus.

The present invention is applicable to various forms of cameras such as a video movie camera, a video still camera, a camera using a silver halide film, a camera having an interchangeable lens which includes or does not include an optical blur correction unit, a single-lens reflex camera, a lens shutter camera, and a monitoring camera. The present invention is also applicable to image-sensing devices, optical devices, and some other devices except for cameras. Furthermore, the present invention can be applied to apparatuses, methods, and a computer program product such as computer-readable storage media applied to these cameras, image-sensing devices, optical devices, and other devices, and to elements constituting them.

According to the preferred embodiment as has been described above, when an object image is to be recorded, a blur of this object image is optically corrected. When an object image is to be displayed without being recorded, a blur of this object image is corrected not optically but by image signal processing. Therefore, when an object image is observed before image sensing, power consumption by correction of a blur of the image can be reduced. In addition, a high-quality object image can be recorded when image sensing is performed. Consequently, the blur of an image can be effectively corrected with low power consumption.

According to the preferred embodiment, correction of a blur of an object image is optically started in the image-sensing preparation stages. Accordingly, a high-quality object image obtained by optical blur correction can be observed before image sensing.

According to the preferred embodiment, in the image-sensing preparation stages, only blur detection for optical blur correction is performed without performing optical blur correction. Therefore, even when blur detection preparations take time, optical blur correction can be started with a small time lag when image sensing is started. This can reduce power consumption and at the same time prevent a user from losing a shutter chance.

Furthermore, according to the preferred embodiment, the proper blur correction taking account of power consumption in accordance with the level of a driving power supply can be performed.

As many apparently widely different embodiments of the present invention can be made without departing from the spirit and scope thereof, it is to be understood that the invention is not limited to the specific embodiments thereof except as defined in the appended claims.

What is claimed is:

1. An image-sensing apparatus comprising:
   a recorder recording an object image;
   a display displaying an object image;
   a first blur correction unit optically correcting a blur of an object image to be recorded by said recorder;
   a second blur correction unit correcting a blur of an object image to be displayed by said display by image signal processing; and
   a controller arranged to operate said second correction unit without operating said first correction unit when said display displays an object image while said recorder does not record an object image, and to operate said first correction unit when said recorder records an object image.

2. The apparatus according to claim 1, wherein the apparatus further comprises an image-sensing device receiving an object image and converting the object image into an image signal, and said recorder records the object image on the basis of the image signal obtained by said image-sensing device.

3. The apparatus according to claim 2, wherein said display displays the object image on the basis of the image signal obtained by said image-sensing device.

4. The apparatus according to claim 1, wherein the apparatus further comprises an image-sensing device receiving an object image and converting the object image into an image signal, and said display displays the object image on the basis of the image signal obtained by said image-sensing device.

5. The apparatus according to claim 1, wherein when said recorder records the object image, said controller operates said first correction unit while stopping the operation of said second correction unit.

6. The apparatus according to claim 2, further comprising an image-sensing optical system forming an object image on said image-sensing device.

7. The apparatus according to claim 1, wherein the apparatus further comprises:
an image-sensing instruction unit arranged to instruct image-sensing preparations; and
an image-sensing start instruction unit arranged to instruct the start of image sensing, and
said controller starts the operation of said first correction unit in accordance with the image-sensing preparation instruction from said image-sensing preparation instruction unit, and operates said recorder in accordance with the image-sensing start instruction from said image-sensing start instruction unit.

8. The apparatus according to claim 7, wherein said controller stops the operation of said second correction unit in accordance with the image-sensing preparation instruction from said image-sensing preparation instruction unit.

9. The apparatus according to claim 1, wherein the apparatus further comprises:
an image-sensing preparation instruction unit arranged to instruct image-sensing preparations;
an image-sensing start instruction unit arranged to instruct the start of image sensing; and
a blur detector detecting a blurred state of an object image, and
said controller starts the operation of said blur detector in accordance with the image-sensing preparation instruction from said image-sensing preparation instruction unit, and causes said first correction unit to start an operation corresponding to the detection result from said blur detector and operates said recorder in accordance with the image-sensing start instruction from said image-sensing start instruction unit.

10. The apparatus according to claim 9, wherein said controller stops the operation of said second correction unit in accordance with the image-sensing start instruction from said image-sensing start instruction unit.

11. The apparatus according to claim 7, wherein said image-sensing preparation instruction unit designates one of photometry and auto-focusing as the image-sensing preparation instruction.

12. The apparatus according to claim 7, further comprising an operating member arranged to operate said image-sensing preparation instruction unit in accordance with a first operation of a series of operations, and to operate said image-sensing start instruction unit in accordance with a second operation of the series of operations.

13. The apparatus according to claim 12, wherein said operating member comprises a shutter release member.

14. The apparatus according to claim 1, wherein the apparatus further comprises a display instruction unit arranged to instruct display start for causing said display to start displaying the object image, and said second correction unit starts operating in accordance with the display start instruction from said display instruction unit.

15. The apparatus according to claim 1, wherein the apparatus further comprises:
a battery checker detecting the level of a power-supply battery for driving said first correction unit;
an image-sensing preparation instruction unit arranged to instruct image-sensing preparations; and
an image-sensing start instruction unit arranged to instruct the start of image sensing, and
when the detection result from said battery checker is not less than a first level, said controller starts the operation of said first correction unit in accordance with the image-sensing preparation instruction from said image-sensing preparation instruction unit, and operates said recorder in accordance with the image-sensing start instruction from said image-sensing start instruction unit.

16. The apparatus according to claim 15, wherein when the detection result from said battery checker is less than the first level and not less than a second level, said controller starts the operation of said blur detector in accordance with the image-sensing preparation instruction from said image-sensing preparation instruction unit, and causes said first correction unit to start an operation corresponding to the detection result from said blur detector and operates said recorder in accordance with the image-sensing start instruction from said image-sensing start instruction unit.

17. The apparatus according to claim 16, wherein when the detection result from said battery checker is less than the second level, said controller operates said recorder without starting the operation of said first correction unit in accordance with the image-sensing start instruction from said image-sensing start instruction unit.

18. The apparatus according to claim 16, wherein when the detection result from said battery checker is less than the second level, said-controller operates said recorder while operating said second correction unit without starting the operation of said first correction unit in accordance with the image-sensing start instruction from said image-sensing start instruction unit.

19. The apparatus according to claim 15, wherein when the detection result from said battery checker is smaller than the first level and not less than a second level, said controller starts the operation of said first correction unit and operates said recorder in accordance with the image-sensing start instruction from said image-sensing start instruction unit.

20. The apparatus according to claim 1, wherein the apparatus further comprises:
a battery checker detecting the level of a power-supply battery for driving said first correction unit;
an image-sensing preparation instruction unit arranged to instruct image-sensing preparations;
an image-sensing start instruction unit arranged to instruct the start of image sensing; and
a blur detector detecting a blurred state of an object image, and
when the detection result from said battery checker is less than a first level and not less than a second level, said controller starts the operation of said blur detector in accordance with the image-sensing preparation instruction from said image-sensing preparation instruction unit, and causes said first correction unit to start an operation corresponding to the detection result from said blur detector and operates said recorder in accordance with the image-sensing start instruction from said image-sensing start instruction unit.

21. The apparatus according to claim 20, wherein when the detection result from said battery checker is less than the second level, said controller operates said recorder without starting the operation of said first correction unit in accordance with the image-sensing start instruction from said image-sensing start instruction unit.

22. The apparatus according to claim 20, wherein when the detection result from said battery checker is less than the second level, said controller operates said recorder while operating said second correction unit without starting the operation of said first correction unit in accordance with the image-sensing start instruction from said image-sensing start instruction unit.

23. The apparatus according to claim 1, wherein the apparatus further comprises:
   a battery checker detecting the level of a power-supply battery for driving said first correction unit; and
   an image-sensing start instruction unit arranged to instruct the start of image sensing, and
   when the detection result from said battery checker is less than a first level and not less than a second level, said controller starts the operation of said first correction unit and operates said recorder in accordance with the image-sensing start instruction from said image-sensing start instruction unit.

24. The apparatus according to claim 1, wherein the apparatus further comprises:
   a battery checker detecting the level of a power-supply battery for driving said first correction unit; and
   an image-sensing start instruction unit arranged to instruct the start of image sensing, and
   when the detection result from said battery checker is less than a predetermined level, said controller operates said recorder without starting the operation of said first correction unit in accordance with the image-sensing start instruction from said image-sensing start instruction unit.

25. The apparatus according to claim 1, wherein the apparatus further comprises:
   a battery checker detecting the level of a power-supply battery for driving said first correction unit; and
   an image-sensing start instruction unit arranged to instruct the start of image sensing, and
   when the detection result from said battery checker is less than a predetermined level, said controller operates said recorder while operating said second correction unit without starting the operation of said first correction unit in accordance with the image-sensing start instruction from said image-sensing start instruction unit.

26. The apparatus according to claim 1, further comprising an image-sensing field angle adjuster arranged to adjust an image-sensing field angle of an image-sensing optical system from a first field angle to a second field angle as a wide angle when said second correction unit operates, and to return the image-sensing field angle from the second field angle to the first field angle when said second correction unit terminates the operation.

27. The apparatus according to claim 1, wherein said display displays a central portion, a blur of which is corrected by said second correction unit, of an object image in a central portion of a display region, and displays a peripheral portion, a blur of which is uncorrected, of the object image in a peripheral portion of the display region.

28. The apparatus according to claim 1, wherein said display displays a portion, a blur of which is corrected by said second correction unit, of an object image in an entire display region, and displays, in a reduced scale, an object image whose blur is not corrected by said second correction unit in a portion of the display region.

29. An image-sensing apparatus comprising:
   a recorder recording an object image;
   a display displaying an object image;
   a first blur correction unit optically correcting a blur of the object image to be recorded by said recorder;
   a second blur correction unit correcting a blur of the object image to be displayed by said display by image signal processing; and
   a controller arranged to operate said second correction unit without operating said first correction unit in a display mode in which said display displays the object image while said recorder does not record the object image, and to operate said first correction unit in response to switching to a recording mode in which said recorder records the object image.

30. The apparatus according to claim 29, wherein the apparatus further comprises an image-sensing device receiving an object image and converting the object image into an image signal, and
   said recorder records the object image on the basis of the image signal obtained by said image-sensing device.

31. The apparatus according to claim 30, wherein said display displays the object image on the basis of the image signal obtained by said image-sensing device.

32. The apparatus according to claim 29, wherein the apparatus further comprises an image-sensing device receiving an object image and converting the object image into an image signal, and
   said display displays the object image on the basis of the image signal obtained by said image-sensing device.

33. The apparatus according to claim 29, wherein in response to switching from the display mode to the recording mode, said controller stops the operation of said second correction unit and starts the operation of said first correction unit.

34. An image-sensing apparatus capable of optically correcting a blur of an object image to be recorded by using a first correction unit, comprising:
   a recorder recording an object image;
   a display displaying an object image;
   a second blur correction unit correcting a blur of an object image to be displayed by said display by image signal processing; and
   a controller arranged to operate said second correction unit without operating said first correction unit when said display displays the object image while said recorder does not record the object image, and to operate said first correction unit when said recorder records the object image.

35. A method of controlling an image-sensing apparatus comprising a recorder for recording an object image and a display for displaying an object image, comprising the steps of:
   operating a second correction unit for correcting a blur of an object image to be displayed by said display by image signal processing without operating a first correction unit for optically correcting a blur of an object image to be recorded by said recorder, when said display displays an object image while said recorder does not record the object image; and operating said first correction unit when said recorder records the object image.

36. A method of controlling an image-sensing apparatus comprising a recorder for recording an object image and a display for displaying an object image, comprising the steps of:

operating a second correction unit for correcting a blur of an object image to be displayed by said display by image signal processing without operating a first correction unit for optically correcting a blur of an object image to be recorded by said recorder, in a display mode in which said display displays an object image while said recorder does not record the object image; and operating said first correction unit in response to switching to a recording mode in which said recorder records the object image.

37. A computer program product providing a control program of an image-sensing apparatus comprising a recorder for recording an object image and a display for displaying an object image, said control program comprising the steps of:

operating a second correction unit for correcting a blur of an object image to be displayed by said display by image signal processing without operating a first correction unit for optically correcting a blur of an object image to be recorded by said recorder, when said display displays an object image while said recorder does not record the object image; and operating said first correction unit when said recorder records the object image.

38. A computer program product providing a control program of an image-sensing apparatus comprising a recorder for recording an object image and a display for displaying an object image, said control program comprising the steps of:

operating a second correction unit for correcting a blur of an object image to be displayed by said display by image signal processing without operating a first correction unit for optically correcting a blur of an object image to be recorded by said recorder, in a display mode in which said display displays an object image while said recorder does not record the object image; and operating said first correction unit in response to switching to a recording mode in which said recorder records the object image.

* * * * *